Patented June 2, 1942

2,285,178

UNITED STATES PATENT OFFICE 2,285,178

POLYAMIDES COMBINED WITH CELLULOSE DERIVATIVES

Kurt Thinius, Eilenburg, Germany, assignor to Deutsche Celluloidfabrik Aktiengesellschaft, Eilenburg, Germany, a corporation of Germany No Drawing. Application September 4, 1940, Serial No. 355,404. In Germany July 29, 1939

2 Claims. (Cl. 260—13)

This invention relates to the manufacture of polyamides combined with cellulose derivatives the latter being soluble in organic solvents.

It is known to manufacture solutions of mixed-condensation products obtained from dicarboxylic acids with diamines of at least four carbon atoms between the two amino groups on the one hand and ω-aminocarboxylic acids and their amide-forming derivatives, such as esters, lactams, acid chlorides of at least five carbon atoms between the amino- and carboxyl group on the other hand. Ethylene chlorohydrine is used as solvent for these polycondensation products.

This invention has as an object the preparation of new compositions of matter comprising solutions of the said polyamides combined with cellulose derivatives which are soluble in organic solvents.

Further objects will appear hereinafter.

It has been found that the solutions of the polyamide in ethylene chlorohydrine which can be diluted to a great extent with solvents containing hydroxyl, especially ethyl alcohol or glycol ethers, are preferably adapted to combine the polyamide with cellulose derivatives, esters, ethers, ether-esters, which latter are soluble in organic solvents. The combination of the cellulose derivatives with the polyamide is so accomplished, that there is produced a solution of polyamide in ethylene chlorohydrine containing a maximum amount of polyamide. This solution is then extensively diluted with organic solvents containing hydroxyl, for instance with 2–10 times the amount of ethyl alcohol. There is then added the cellulose derivative. According to the properties of solubility it is sometimes necessary, in order to obtain a quick and complete dissolution of the cellulose derivative, to add still further solvents not belonging to the group containing hydroxyl. Thanks to the great dilution capacity of the solutions of the nitrocellulose with solvents containing hydroxyl it is possible, when using these cellulose derivatives, to add only very small quantities of these solvents, for instance acetic ester, and yet to obtain a well drying film.

This invention is described more specifically in the following examples.

Example I 58 grams of a 25%-solution in ethylene chlorohydrine of a polyamide consisting of 50% hexamethylenediamine diadipate and 50% ε-caprolactam were mixed by shaking with 140 grams 99% ethyl alcohol. To this clear viscous solution there were added 17 grams middle-viscous, ester-soluble nitrocellulose with 35% alcohol-content. The nitrocellulose swells in this mixture and dissolves when adding gradually 50 grams ether. A precipitation which occasionally occurs is at once dissolved, when stirring. After complete dissolution of the nitrocellulose the solution is cast into a film in the usual manner. A flexible, very clear film is obtained.

Example II 20 grams of a 20% polyamide solution in ethylene chlorohydrine are diluted with 40 grams ethyl alcohol (94%). Into this solution there is gradually discharged a solution of 6 grams high-viscous, alcohol-wet nitrocellulose in 20 grams ethyl alcohol (94%) and 5 grams acetic ester. A clear solution results which yields a clear lacquer-coating after evaporation. This is highly surprising, since the nitrocellulose solution contains a minimum of true solvents, and ethylene chlorohydrine therefore does not act as dissolving agent for the nitrocellulose. It is also possible to stir slowly the polyamide solution directly into the alcoholic nitrocellulose solution without previously diluting the same with alcohol. By this method, however, formation of lumps cannot be avoided.

Example III 60 grams of a 25% solution of the polyamide in ethylene chlorohydrine are mixed with 60 grams ethyl alcohol (94%) and there are added 15 grams ethylcellulose. The cellulose ether is dissolved within a short time. The dissolution can be accelerated by toluene, the quantity of which depends on the degree of ethylation of the ethylcellulose. Also this solution leaves behind a clear film after evaporation.

Example IV

The manufacture of a mixed-film consisting of polyamide and benzyl cellulose is so accomplished, that first of all the solution of the polyamide is diluted with the ethyl ether of the ethylene glycol, with alcohol and few parts of toluene. Therein the benzyl cellulose is dissolved. This solution is cast into a film in the usual manner.

Example V

In order to combine acetyl cellulose (about 56% acetic acid contents) with polyamide, the polyamide solution is preferably diluted with three times the quantity of the methyl ether of the ethylene glycol. The acetyl cellulose is then dissolved therein, perhaps, after adding more solvent. The admixture of acetone accelerates the dissolution of the acetylcellulose. The quantity of the acetone, however, remains below that of the methyl glycol. The cellulose derivatives and the polyamide may be combined in any proportion and this proportion varies within wide limits.

There may be added to the solution in the usual way plasticizers, pigments, dyestuffs, filling agents and the like. The solutions may be used for the manufacture of films, novel materials instead of Celluloid, for foils, filaments, bristles, coatings for artificial leather and similar products, for adhesives, surface-coatings and the like.

What I claim is:

1. The process of forming a mixed solution of a cellulose derivative and a mixed polyamide, said cellulose derivative taken from the class consisting of cellulose esters and cellulose ethers, said mixed polyamide being a polymerized mixed reaction product of (1) a dicarboxylic acid and a diamine of at least 4 carbon atoms between the two amino groups with (2) a substance taken from the group consisting of an ω-amino-carboxylic acid, an ester of an ω-amino-carboxylic acid, a lactam derivative of an ω-amino-carboxylic acid, and an acid chloride derivative of an ω-amino-carboxylic acid, said ω-amino carboxylic acid having at least five carbon atoms between the amino and carboxyl groups, which comprises dissolving said mixed polyamide in ethylene chlorohydrine to form a substantially saturated solution of said polyamide, diluting said solution with from two to ten times the amount of said solution of a substance taken from the group consisting of ethyl alcohol, methyl ether of ethylene glycol and ethyl ether of ethylene glycol, and dissolving said cellulose derivative in said diluted solution.

2. The process of forming a mixed solution of cellulose nitrate and a mixed polyamide, said mixed polyamide being a polymerized mixed reaction product of (1) a dicarboxylic acid and a diamine of at least 4 carbon atoms between the two amino groups with (2) a substance taken from the group consisting of an ω-amino-carboxylic acid, an ester of an ω-amino-carboxylic acid, a lactam derivative of an ω-amino-carboxylic acid, and an acid chloride derivative of an ω-amino-carboxylic acid, said ω-amino carboxylic acid having at least five carbon atoms between the amino and carboxylic groups, which comprises dissolving said mixed polyamide in ethylene chlorohydrine to form a substantially saturated solution of said polyamide, dissolving said cellulose nitrate in ethyl alcohol and ethyl acetate, diluting said polyamide solution with from two to ten times the amount of said solution of ethyl alcohol, and mixing said polyamide and cellulose nitrate solutions to obtain a clear mixed solution.

KURT THINIUS.